(12) United States Patent
Kawamoto et al.

(10) Patent No.: US 9,260,040 B2
(45) Date of Patent: Feb. 16, 2016

(54) VEHICLE SEAT

(71) Applicants: HONDA MOTOR CO., LTD., Tokyo (JP); TACHI-S CO., LTD., Akishima-shi, Tokyo (JP)

(72) Inventors: Yasunobu Kawamoto, Utsunomiya (JP); Taichi Yokoyama, Tokyo (JP)

(73) Assignees: HONDA MOTOR CO., LTD., Tokyo (JP); TACHI-S CO., LTD, Tokyo (JP)

( * ) Notice: Subject to any disclaimer, the term of this patent is extended or adjusted under 35 U.S.C. 154(b) by 0 days.

(21) Appl. No.: 14/253,921

(22) Filed: Apr. 16, 2014

(65) Prior Publication Data

US 2014/0312671 A1 Oct. 23, 2014

(30) Foreign Application Priority Data

Apr. 19, 2013 (JP) ................................. 2013-088504

(51) Int. Cl.
*B60N 2/20* (2006.01)
*B60N 2/36* (2006.01)
*B60N 2/44* (2006.01)

(52) U.S. Cl.
CPC *B60N 2/36* (2013.01); *B60N 2/366* (2013.01); *B60N 2/449* (2013.01)

(58) Field of Classification Search
CPC .......... B60N 2/20; B60N 2/203; B60N 2/206; B60N 2205/35; B60N 2205/40; B60N 2/36; B60N 2/449
See application file for complete search history.

(56) References Cited

U.S. PATENT DOCUMENTS

| | | | |
|---|---|---|---|
| 6,802,563 B1 * | 10/2004 | Mysliwiec et al. | 297/284.9 |
| 2003/0062759 A1 * | 4/2003 | Gupta et al. | 297/452.65 |
| 2010/0314920 A1 * | 12/2010 | Arata et al. | 297/217.3 |
| 2014/0138999 A1 * | 5/2014 | Stesl et al. | 297/378.12 |

FOREIGN PATENT DOCUMENTS

| | | | |
|---|---|---|---|
| JP | 2010-285080 A | | 12/2010 |
| JP | 2011051475 A | * | 3/2011 |

* cited by examiner

*Primary Examiner* — Elizabeth A Plummer
(74) *Attorney, Agent, or Firm* — Westerman, Hattori, Daniels & Adrian, LLP (57) ABSTRACT

A vehicle seat includes a rotationally moving hook mechanism provided on a seat back, and a striker disposed in a rear of the seat back and fixed onto a vehicle body. The vehicle seat includes a left lock mechanism and a right lock mechanism which fix the seat back at an erection position, and a supporting bracket that is provided on the vehicle body to tiltably support the seat back. The striker and the supporting bracket are disposed on a rear side of each of a left side bolster and a right side bolster. An insertion hole, a fixing wire and a protruding portion are provided on the left side bolster and the right side bolster, and on the striker and the supporting bracket to determine positions of the left side bolster and the right side bolster and positions of the striker and the supporting bracket.

3 Claims, 6 Drawing Sheets

VEHICLE SEAT

CROSS REFERENCE TO RELATED APPLICATIONS

Priority is claimed on Japanese Patent Application No. 2013-088504, filed on Apr. 19, 2013, the content of which is incorporated herein by reference.

BACKGROUND OF THE INVENTION

1. Field of the Invention

The present invention relates to a vehicle seat.

2. Description of Related Art

A vehicle seat is known which includes a seat back that doubles with a partition to separate a rear luggage compartment from a passenger compartment.

The seat back is provided tiltably with respect to a seat cushion that is disposed substantially in parallel with a floor of the vehicle. In this kind of vehicle seat, a side bolster may be fixed to a vehicle body for minimizing a gap between each left and right end of the seat back at an erection position and a side wall of a vehicle body. This configuration can improve a vehicle's interior design (for example, refer to Japanese Unexamined Patent Application, First Application No. 2010-285080).

However, in the related art described above, there is a problem in that due to a manufacturing error of the seat back, the side bolster or the like, a gap or a difference in level unexpectedly occurs between the seat back at the erection position and the side bolster, and the design deteriorates.

SUMMARY OF THE INVENTION

The present invention is made in light of the problem, and an object of the present invention is to provide a vehicle seat which can minimize a gap or a difference in level between a seat back at an erection position and a side bolster.

An embodiment of the present invention adopts the following means to solve the problem.

(1) A vehicle seat according to an aspect of the present invention includes a seat back that is provided tiltably with respect to a floor of a vehicle body or a seat cushion which is disposed along an extension direction of the floor; a side bolster that is provided between the outside in a width direction of the seat back and a side wall of the vehicle body; a lock mechanism that includes a lock provided on the seat back, and a striker which is disposed at a rear of the seat back and is fixed onto the vehicle body, the lock mechanism fixing the seat back at an erection position; and a supporting bracket that is provided on the vehicle body or the seat cushion to tiltably support the seat back. A backrest surface of the seat back and a front surface of the side bolster to each other. A vehicle body member configured to have the striker and the supporting bracket is disposed on a rear side of the side bolster. A position determination mechanism is provided in the side bolster and in at least one of the striker and the supporting bracket to determine positions of the side bolster and the vehicle body member.

(2) In the vehicle seat according to the aspect of the present invention, the position determination mechanism may have: an engagement hole that is provided in at least one of the striker and the supporting bracket; and a protruding piece that protrudes from a rear surface of the side bolster and is insertable into the engagement hole.

(3) In the vehicle seat according to the aspect of the present invention, the position determination mechanism may be provided at both the striker and the supporting bracket. Opening directions of both engagement holes of the striker and the supporting bracket may be set to be substantially the same as a protruding direction of each protruding piece of the side bolster.

(4) In the vehicle seat according to the aspect of the present invention, a fixing portion for fixing the side bolster onto the vehicle body may be provided in a portion different from a portion where the position determination mechanism is provided.

According to the aspect (1), it is possible to determine the position of the side bolster with respect to the vehicle body member that determines an erection position of the seat back. In this way, since the positions of the seat back and the side bolster are determined by the same member, it is possible to determine a relative position between the seat back and the side bolster with a high accuracy. For this reason, it is possible to prevent a gap or a difference in level from unexpectedly occurring between the seat back at the erection position and the side bolster, and it is possible to improve the design.

According to the aspect (2), it is possible to configure the position determination mechanism with a simple structure, and it is possible to reduce costs of manufacturing the vehicle seat.

According to the aspect (3), it is possible to easily attach the side bolster to the striker and the bracket.

According to the aspect (4), it is possible to determine the position of the side bolster by using the position determination mechanism, and then to reliably fix the side bolster onto the vehicle body. For this reason, it is possible to improve workability of attaching the side bolster.

DETAILED DESCRIPTION OF THE INVENTION

Subsequently, an embodiment of the present invention will be described with reference to the accompanying drawings.

Figure 1:
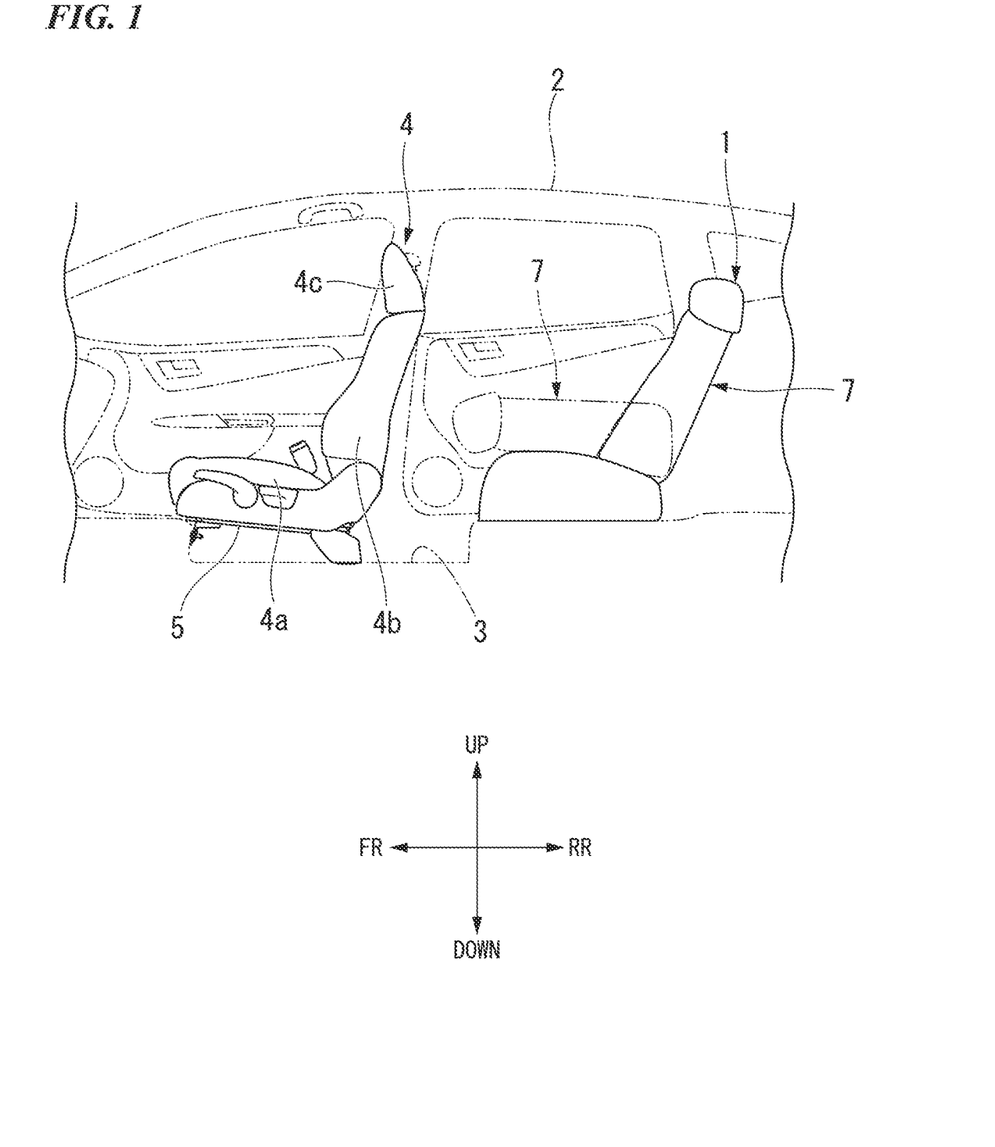
FIG. 1 is a side view of a vehicle body according to an embodiment of the present invention.

FIG. 1 is a side view of a vehicle body 2 on which a vehicle seat 1 is mounted.

In the drawings, reference letter FR indicates the front (hereinafter, simply referred to as the front) of the vehicle in a travelling direction of the vehicle.

Reference letter RR indicates the rear (hereinafter, simply referred to as the rear) of the vehicle in the travelling direction of the vehicle. Furthermore, reference letter UP indicates the upward (hereinafter, simply referred to as the upward) in a vertical direction, and reference letter DOWN indicates the downward (hereinafter, simply, referred to as the downward) in the vertical direction. Reference letter RB indicates the right (hereinafter, simply referred to as the right) of the vehicle in a width direction of the vehicle, and reference letter LB indicates the left (hereinafter, simply referred to as the left) of the vehicle in the width direction of the vehicle.

(Vehicle Body)

As illustrated in FIG. 1, a driver seat (not illustrated) for a driver and a front passenger seat 4 for an occupant are provided on a floor 3 of the vehicle body 2, and the seat 1 (a rear row seat) for a vehicle is provided in a rear row-side.

The driver seat and the front passenger seat 4 has the same structure, and includes a seat cushion 4a which is a sitting surface, a seat back 4b and a head rest 4c. A pair of slide rails 5 is disposed at positions corresponding to the driver seat and the front passenger seat 4 on the floor 3 in such a manner that each of the slide rails extend in a front and rear direction and is in parallel with each other in a left and right direction. The driver seat and the front passenger seat 4 are slidably attached onto each of the pair of slide rails 5.

(Vehicle Seat)

Figure 2:
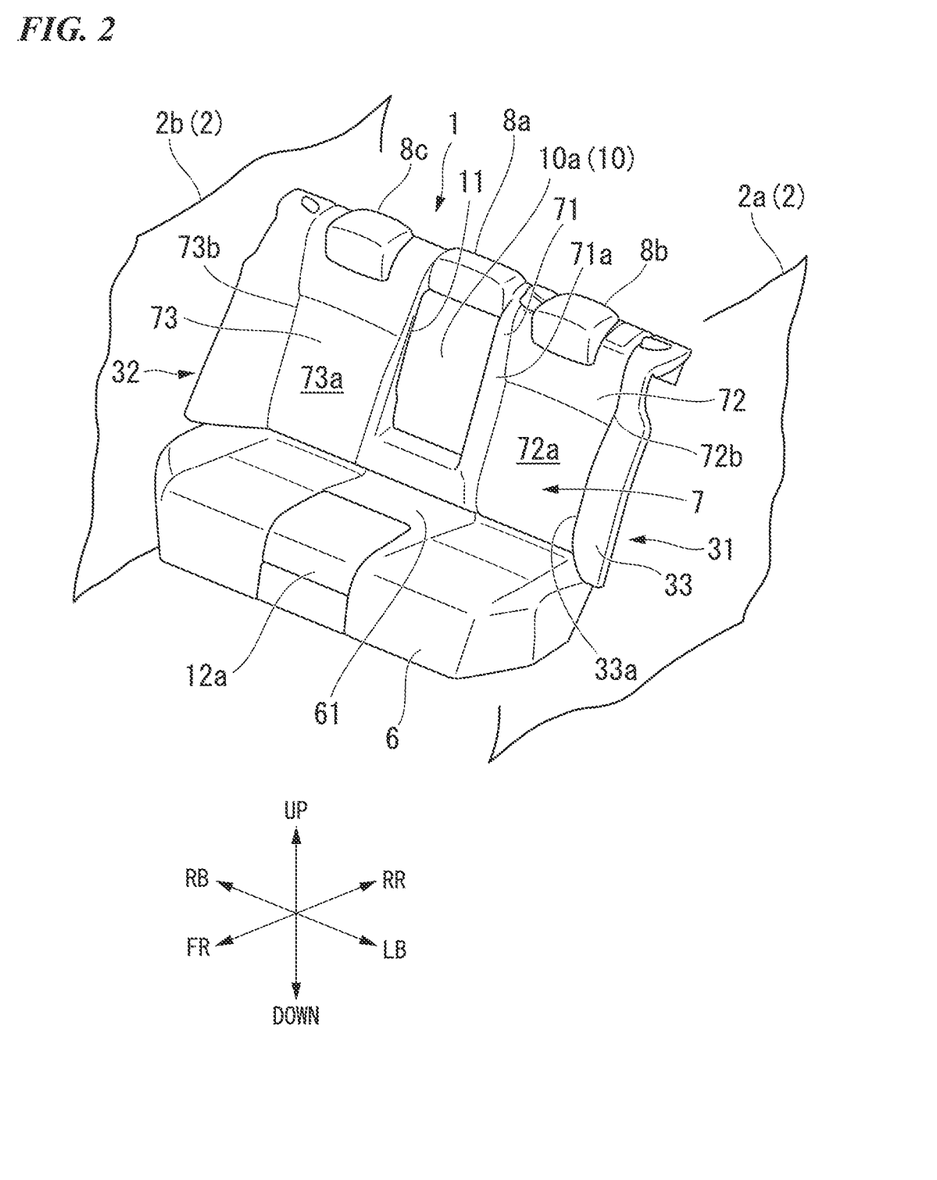
FIG. 2 is a perspective view of a vehicle seat according to the embodiment of the present invention when seen from the front side of the seat.
Figure 3:
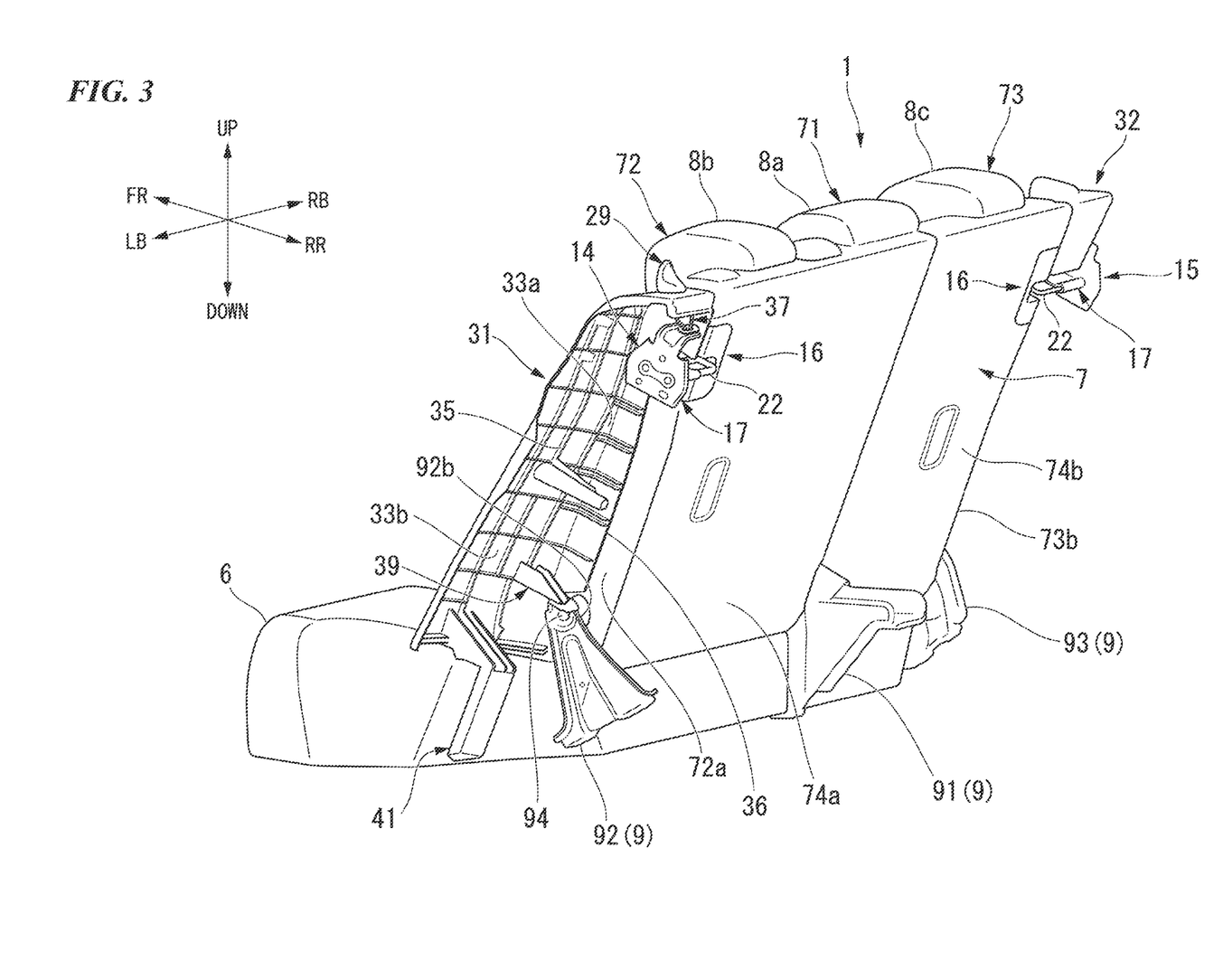
FIG. 3 is a perspective view of the vehicle seat according to the embodiment of the present invention when seen from a rear of the seat.

FIG. 2 is a perspective view of the vehicle seat 1 when seen from a front side of the vehicle seat 1, and FIG. 3 is a perspective view of the vehicle seat 1 when seen from the rear of the vehicle seat 1.

As illustrated in FIGS. 2 and 3, the vehicle seat 1 is a bench type seat for three persons, and includes a seat cushion 6 which is a seating surface, a seat back 7, and a head rest 8 (8a, 8b and 8c). The seat back 7 is rotatably supported by a supporting bracket 9 that is fixed to the floor 3 (refer to FIG. 1) of the vehicle body 2. Accordingly, the seat back 7 can tilt toward the front.

The vehicle seat 1 is a 6:4 split type seat, and the seat back 7 is split into two portions in such a manner that either one portion (the center seat portion 71 and the left seat portion 72) or the other portion (the right seat portion 73), or both are tilted toward the front and are folded (refer to a two-dotted chain line in FIG. 1). Floor plates 74a and 74b are provided on a back surface (a rear-side surface) of the seat back 7 to correspond to a splitting location. When the seat back 7 is tilted toward the front and is folded, the floor plates 74a and 74b become floors of the luggage compartment.

In the following description, a position at which the seat back 7 is tilted toward to the front and is folded is referred to as a seat back folding position, and a typical usage position at which the seat back 7 is erected is referred to as a seat back erection position.

Herein, the supporting bracket 9 is configured to have a center bracket 91 provided between the center seat portion 71 and the right seat portion 73, a left bracket 92 provided on a left end 72b of the left seat portion 72, and a right bracket 93 provided on a right end 73b of the right seat portion 73, to correspond to a tilting pattern of the seat back 7.

(Bracket)

Figure 4:
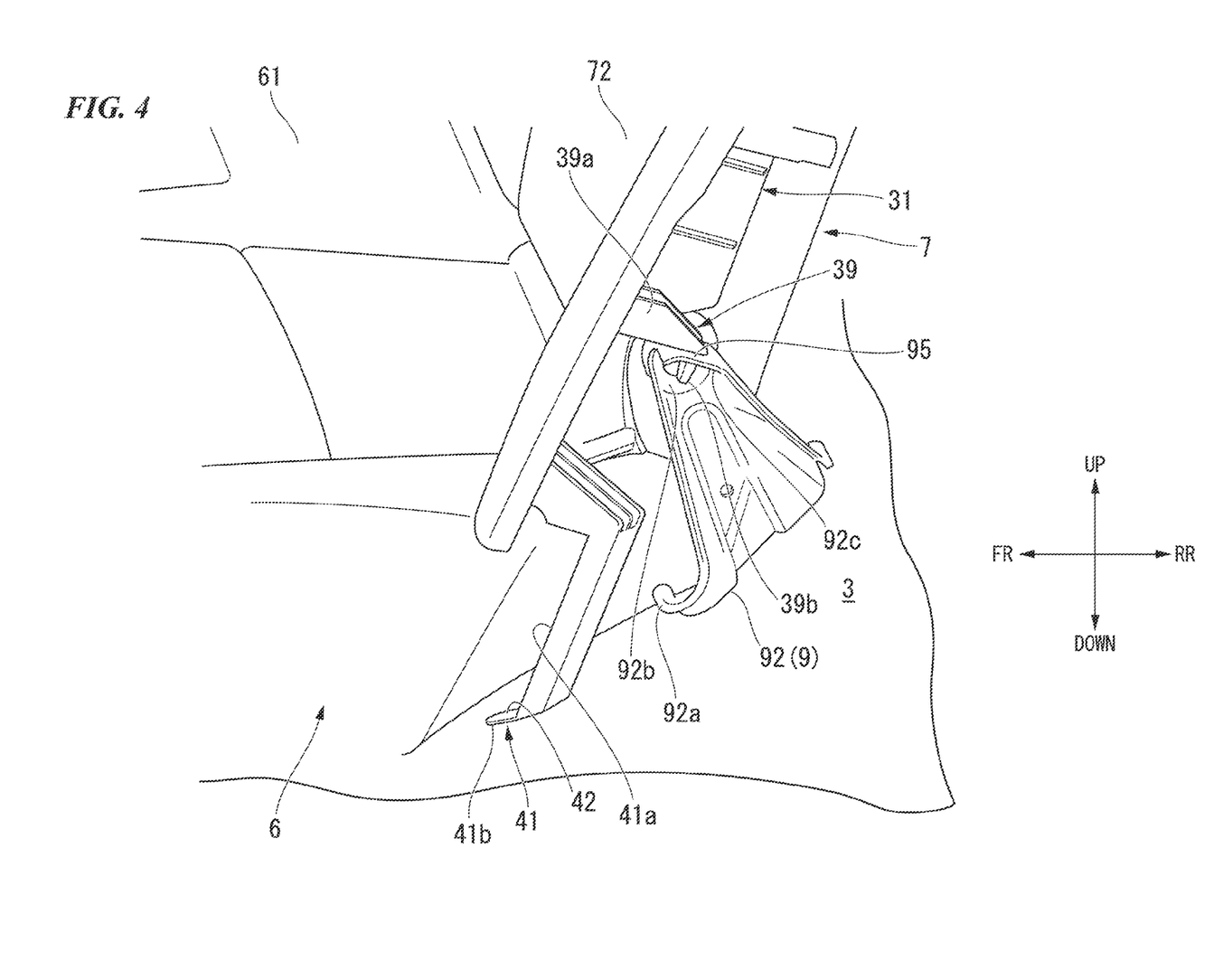
FIG. 4 is an enlarged perspective view of a left bracket according to the embodiment of the present invention.

FIG. 4 is an enlarged perspective view of the left bracket 92.

As illustrated in FIGS. 3 and 4, the left bracket 92 is erected diagonally forward the front on the floor 3 of the vehicle body 2, and is formed to taper toward a distal end thereof. A fixing flange 92a for fixing the left bracket 92 onto the floor 3 is integrally formed on a proximal end of the left bracket 92. The distal end of the left bracket 92 is a shaft fixing portion 92b to which a shaft 94 extending in the width direction of the vehicle is fixed. The seat back 7 is attached to tilt around the center of the shaft 94.

Furthermore, a tongue-shaped portion 92c is integrally formed on an upper edge of the shaft fixing portion 92b, and bends to extend toward a left direction. The tongue-shaped portion 92c is a plate-shaped portion that fixes a left side bolster 31 to be described later, and is formed along a horizontal direction. An insertion hole 95 (an engagement hole) is formed in the tongue-shaped portion 92c, and a protruding portion (a protruding piece) 39 of the left side bolster 31 is inserted into the insertion hole 95.

A right bracket 93 is formed symmetrically with a plane with respect to the left bracket 92, and the symmetry plane is an arbitrary plane that extends along the front and rear direction and in the vertical direction. For this reason, description of the right bracket 93 will be omitted.

At the seat erection position, a left lock mechanism 14 is provided between the upper left end 72b of the left seat portion 72 and a side wall 2a (refer to FIG. 2) on a left side of the vehicle body 2, and a right lock mechanism 15 is provided between the upper right end 73b of the right seat portion 73 and a side wall 2b (refer to FIG. 2) on a right side of the vehicle body 2.

(Lock Mechanism)

Figure 5:
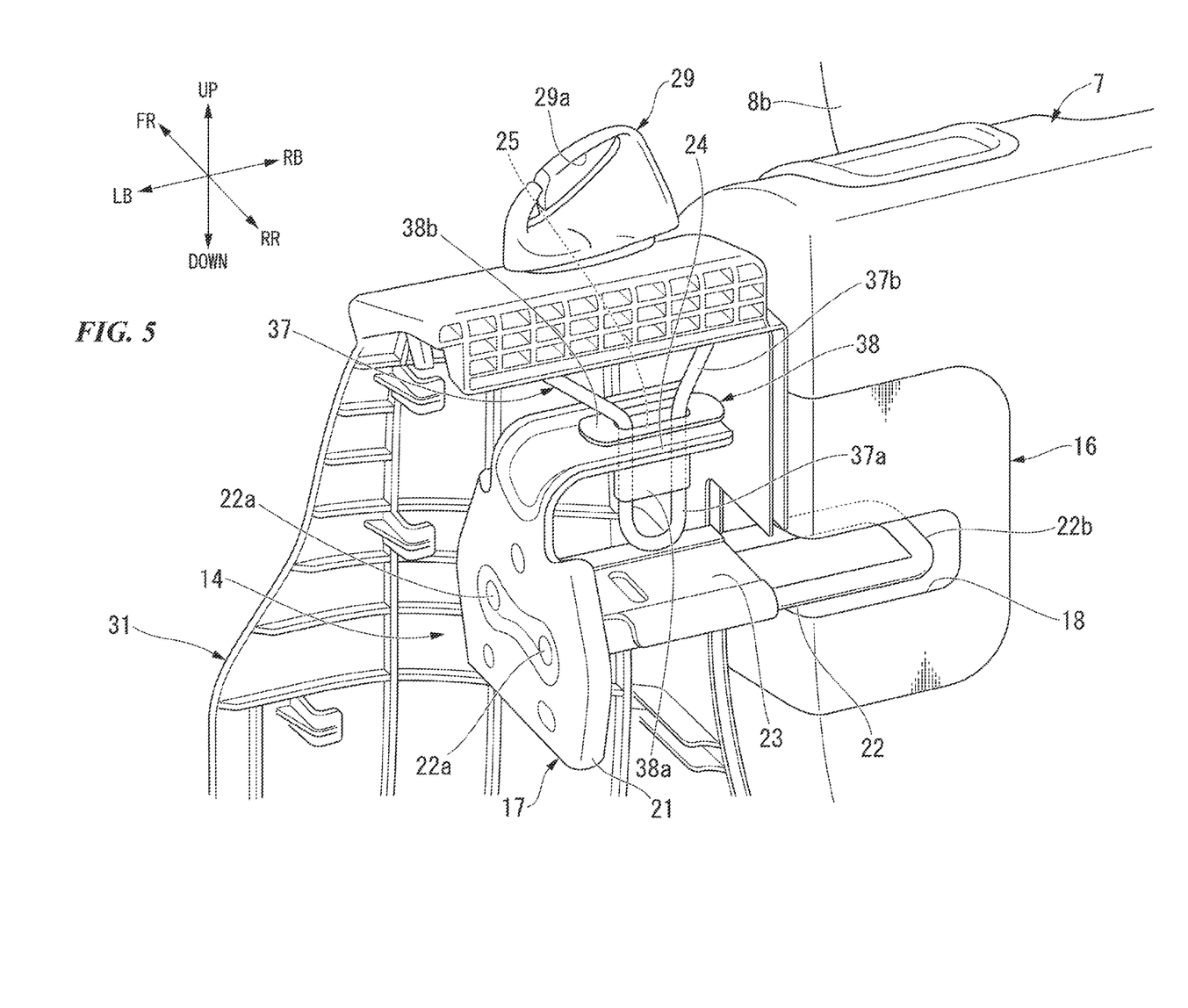
FIG. 5 is an enlarged perspective view of a left lock mechanism according to the embodiment of the present invention.

FIG. 5 is an enlarged perspective view of the left lock mechanism 14.

As illustrated in FIG. 5, the left lock mechanism 14 includes a hook rotating mechanism 16 provided on the upper left end 72b of the left seat portion 72, and a striker 17 that is provided on the side wall 2a (refer to FIG. 2) on the left side of the vehicle body 2 to be engageable and disengageable with respect to the hook rotating mechanism 16.

The hook rotating mechanism 16 includes an insertion groove 18 into which the striker 17 is inserted, and a hook which is not illustrated, and which engages with the striker 17 when the striker 17 is inserted into the insertion groove 18. The hook is supported rotatably, and is always biased toward an engagement position by a spring which is not illustrated.

The striker 17 has a bracket portion 21 fixed to the side wall 2a on the left side of the vehicle body 2. A striker main body 22 is erected toward the seat back 7 on a substantially center portion of the bracket portion 21. The striker main body 22 is obtained by bending a round metal bar in a substantially U shape, and two tip ends 22a and 22a of the striker main body 22 are fixed to the bracket portion 21. A bending portion 22b of the striker main body 22 is inserted into the insertion groove 18 of the rotationally moving hook mechanism 16 from a rear of the seat back 7.

A reinforcement plate 23 is provided on a position close to two tip ends 22a and 22a of the striker main body 22 to straddle two tip ends 22a and 22a. Accordingly, it is possible to ensure sufficient strength of the striker main body 22.

In this configuration, when the seat back 7 is erected from the seat back folding position to the seat back erection position, the striker main body 22 of the striker 17 is inserted into the insertion groove 18 of the hook rotating mechanism 16. Then, the striker main body 22 engages with the hook which is not illustrated. Accordingly, the seat back erection position of the seat back 7 is determined, and the seat back erection position is maintained.

Furthermore, an upper end of the bracket portion 21 bends to extend toward the seat back 7 to form a tongue-shaped portion 24. The tongue-shaped portion 24 is a plate-shaped portion that fixes the left side bolster 31, to be described later, and is formed along the horizontal direction. A substantially track-shaped insertion hole (an engagement hole) 25 into which a fixing wire 37 of the left side bolster 31 is inserted is formed in the tongue-shaped portion 24.

Herein, the tongue-shaped portion 24 and the tongue-shaped portion 92c, which is formed in the left bracket 92 to rotatably support the seat back 7, are formed along the horizontal direction. The insertion hole 25 formed in the tongue-shaped portion 24 is set to be opened along the vertical direction. The insertion hole 95 formed in the tongue-shaped portion 92c is also set to be opened along the vertical direction.

A right lock mechanism 15 is formed in plane symmetry with respect to the left lock mechanism 14, and the symmetry plane is an arbitrary plane that extends along the front and rear direction and in the vertical direction. For this reason, description of the right lock mechanism 15 will be omitted.

(Armrest and Drink Holder)

Figure 6:
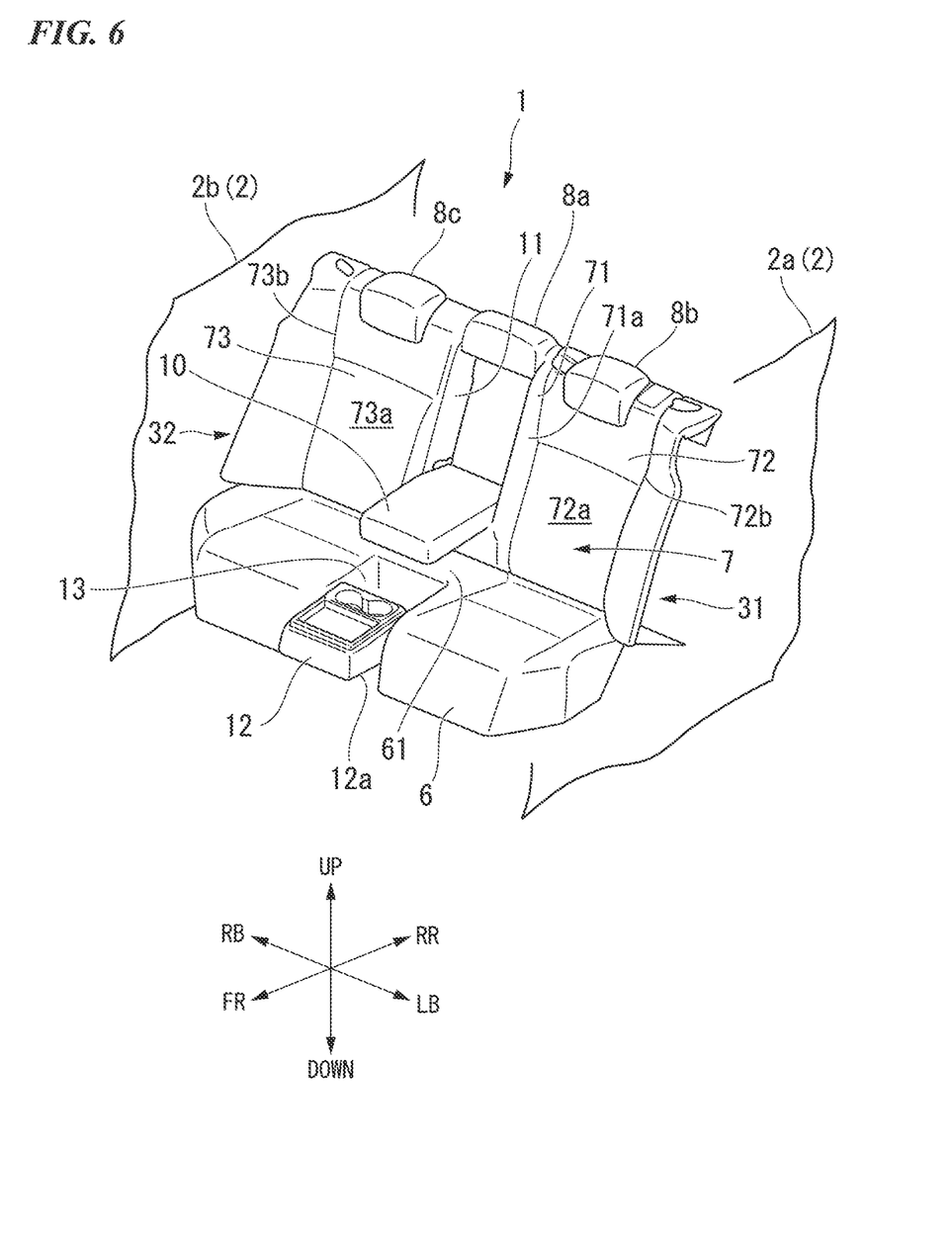
FIG. 6 is a perspective view of the vehicle seat according to the embodiment of the present invention when seen from a front of the seat.

FIG. 6 is a perspective view of the vehicle seat 1 when seen from the front, and illustrates a state where an armrest 10 and a drink holder 12 are drawn out.

As illustrated in FIGS. 2 and 6, a substantially rectangular concave portion 11 that is long in the vertical direction when seen from the front is formed in the center seat portion 71 of the seat back 7, and accommodates the armrest 10.

A proximal end of the armrest 10 is rotatably attached to the center seat portion 71. Accordingly, the armrest 10 can tilt around the proximal end toward the front, and when the armrest 10 is used, the armrest 10 is used by being tilted toward the front. When the armrest 10 is accommodated in the concave portion 11 of the center seat portion 71, a backrest surface 71a of the center seat portion 71 is flush with a backrest surface 10a of the armrest 10.

A cutout portion 13 is formed in a front portion of a center seat portion 61 of the seat cushion 6, and accommodates the drink holder 12. The drink holder 12 is rotatably attached to a front end of the center seat portion 61 of the seat cushion 6. Accordingly, the drink holder 12 can rotate toward the front, and when the drink holder 12 rotationally moves to the front, the drink holder 12 protrudes to the front from the seat cushion 6.

Herein, the drink holder 12 is used in a state where the drink holder 12 protrudes to the front from the seat cushion 6. A bottom surface of the drink holder 12 is covered with a cushion 12a, and when the drink holder 12 is accommodated in the cutout portion 13, the drink holder 12 is configured in such a manner that a back surface of the drink holder 12 becomes the seating surface.

(Side Bolster)

As illustrated in FIGS. 2 and 3, the left side bolster 31 is provided on the left end 72b of the left seat portion 72 of the seat back 7, and a right side bolster 32 is provided on the right end 73b of the right seat portion 73 of the seat back 7. When the seat back 7 is at the seat back erection position, the left side bolster 31 and the right side bolster 32 cover up the gaps between the seat back 7 and the side walls 2a and 2b of the vehicle body 2.

The left side bolster 31 and the right side bolster 32 are in plane symmetry with respect to each other, and the symmetry plane is an arbitrary plane that extends along the front and rear direction and in the vertical direction. For this reason, in the following description, only the left side bolster 31 will be described, and description of the right side bolster 32 will be omitted.

A front surface portion 33 and an inner wall portion 34 are integrally molded to form the left side bolster 31. The front surface portion 33 is continuously formed to reach the side wall 2a on the left side of the vehicle body 2 from a backrest surface 72a of the left seat portion 72 of the seat back 7, and the inner wall portion 34 bends to extend toward the rear from a circumferential edge 33a which is close to the seat back 7 of the front surface portion 33 and faces the left end 72b of the left seat portion 72. A rib 35 for increasing strength of the left side bolster 31 is formed in a grid shape on back surfaces (inner surfaces) 33b and 34a of the front surface portion 33 and the inner wall portion 34.

A cutout portion 36 is formed in the inner wall portion 34 to avoid interference between the inner wall portion 34, and the left lock mechanism 14 and the supporting bracket 9.

Furthermore, as illustrated in FIG. 5, a seat belt guide 29 is provided on an upper portion of the front surface portion 33 to protrude upward. The seat belt guide 29 is formed in a substantially ring shape to be opened in the front and rear direction. A seat belt, which is not illustrated, is inserted into an opening portion 29a of the seat belt guide 29. The seat belt guide 29 is provided on the left side bolster 31. Accordingly, it is possible to prevent the seat belt from winding around the neck of an occupant and thus, preventing the occupant from being uncomfortable.

The fixing wire 37 is provided on a back surface of the upper portion of the front surface portion 33 to extend downward. The fixing wire 37 is obtained by bending a round metal bar, and is configured to have an insertion portion (a protruding piece) 37a formed in a substantially U shape, and supporting portions 37b which extend from two end portions of the insertion portion 37a such that a gap between the supporting portions 37b widens in a direction toward the ends thereof. The insertion portion 37a is disposed to face downward, and end portions of the supporting portion 37b are fixed onto the back surface of the upper portion of the front surface portion 33.

The insertion portion 37a is inserted into the insertion hole 25 formed in the tongue-shaped portion 24 of the left lock mechanism 14 via a wire protection portion 38. The wire protection portion 38 is made of resin, and is configured to have a cylindrical portion 38a that is inserted into the insertion hole 25, and an external flange portion 38b that is molded integrally with an upper end of the cylindrical portion 38a. A cross section of the cylindrical portion 38a is formed in a substantially track shape to correspond to a shape of the insertion hole 25. The external flange portion 38b is in contact with the tongue-shaped portion 24 and thus, a position of the wire protection portion 38 is determined. In this way, the insertion portion 37a of the fixing wire 37 is inserted into the cylindrical portion 38a of the wire protection portion 38 that is attached onto the tongue-shaped portion 24. Accordingly, a position of an upper portion of the left side bolster 31 is determined.

As illustrated in FIG. 4 in detail, the protruding portion 39 is molded integrally with the front surface portion 33 of the left side bolster 31 at a location that corresponds to a location of the left bracket which positions at lower side. The protruding portion 39 is configured to have a supporting portion 39a that protrudes toward the rear from the front surface portion 33, and a protruding main body 39b that protrudes downward from a tip end of the supporting portion 39a. The protruding main body 39b is inserted into the insertion hole 95 formed in the tongue-shaped portion 92c of the left bracket 92. Accordingly, a position of a lower portion of the left side bolster 31 is determined.

Herein, the protruding main body 39b inserted into the insertion hole 95 of the tongue-shaped portion 92c is set to protrude downward, and the fixing wire 37 inserted into the insertion hole 25 of the tongue-shaped portion 24 of the left lock mechanism 14 is also set to extend downward.

Furthermore, a side bolster fixing portion (a fixing portion) 41 is integrally molded on a back surface of a lower end of the front surface portion 33 of the left side bolster 31. The side bolster fixing portion 41 fixes the left side bolster 31 directly onto the vehicle body 2. A fixing portion main body 41a and an attachment portion 41b are integrally molded to form the side bolster fixing portion 41. The fixing portion main body 41a protrudes from the back surface of the front surface portion 33, and the attachment portion 41b bends to extend toward the front from a lower end of the fixing portion main body 41a.

The fixing portion main body 41a extends toward the rear from the back surface of the front surface portion 33, and then bends to extend downward to reach the floor 3, so that the fixing portion main body 41a is formed to have a substantially L-shaped cross section. A through hole 42 is formed in the attachment portion 41b. A bolt, which is not illustrated, is inserted into the through hole 42, and is screwed into a female screw portion that is formed in the floor 3 and is not illustrated. Accordingly, the left side bolster 31 is fixed onto the floor 3.

(Method of Assembling Side Bolster)

Subsequently, a method of assembling each of the side bolsters 31 and 32 will be described. Since the methods of assembling the left side bolster 31 and the right side bolster 32 are the same, only the method of assembling the left side bolster 31 will be mentioned in the following description, and description of the method of assembling the right side bolster 32 will be omitted.

Herein, the insertion hole 25, which is formed in the tongue-shaped portion 24 of the left lock mechanism 14 that determines the seat back erection position of the seat back 7, is set to be opened along the vertical direction. The insertion hole 95, which is formed in the tongue-shaped portion 92c of the left bracket 92 that supports the seat back 7 rotatably, is also set to be opened along the vertical direction. The protruding main body 39b inserted into the insertion hole 95 of the tongue-shaped portion 92c is set to protrude downward, and the fixing wire 37 inserted into the insertion hole 25 of the tongue-shaped portion 24 of the left lock mechanism 14 is also set to extend downward.

For this reason, when the left side bolster 31 is assembled, the left side bolster 31 is moved from the top to the bottom, and the protruding main body 39b is inserted into the insertion hole 95 of the tongue-shaped portion 92c, and the fixing wire 37 is inserted into the insertion hole 25 of the tongue-shaped portion 24. Accordingly, the position of the left side bolster 31 is determined.

Subsequently, the bolt, which is not illustrated, is inserted into the through hole 42 formed in the attachment portion 41b of the side bolster fixing portion 41. The bolt is screwed into the female screw portion that is formed in the floor 3 and is not illustrated and thus, the left side bolster 31 is fixed onto the floor 3. Accordingly, the attachment of the left side bolster 31 is completed.

(Effect)

Accordingly, according to the embodiment, it is possible to determine the position of the upper portion of the left side bolster 31 and a position of an upper portion of the right side bolster 32, respectively, with respect to the left lock mechanism 14 and the right lock mechanism 15 which determine the seat back erection position of the seat back 7. It is possible to determine the position of the lower portion of the left side bolster 31 and a position of a lower portion of the right side bolster 32, respectively, with respect to the left bracket 92 and the right bracket 93 which support the seat back 7 rotatably.

In this way, members that determine the position of the seat back 7 are the same as those that determine the positions of the side bolsters 31 and 32. That is, the position of the seat back 7 and the positions of each of the side bolsters 31 and 32 are determined with respect to each of the left lock mechanism 14 and the right lock mechanism 15, and with respect to each of the brackets 92 and 93. For this reason, it is possible to determine relative positions between the seat back 7 and each of the side bolsters 31 and 32 with a high accuracy.

Accordingly, it is possible to prevent a gap or a difference in level from unexpectedly occurring between the seat back 7 at the erection position and each of the side bolsters 31 and 32, and it is possible to improve the design.

It is possible to determine the position of each upper portion of the side bolsters 31 and 32 simply by inserting each fixing wire 37 of the side bolsters 31 and 32 into the insertion hole 25 formed in each tongue-shaped portion 24 of the left lock mechanism 14 and the right lock mechanism 15. Furthermore, it is possible to determine the position of each lower portion of the side bolsters 31 and 32 simply by inserting each protruding portion 39 into the insertion hole 95 formed in each tongue-shaped portion 92c of the left bracket 92 and the right bracket 93. With this simple structure, it is possible to determine the position of each of the side bolsters 31 and 32, and it is possible to reduce manufacturing costs.

Both of the insertion hole 25 formed in the tongue-shaped portion 24 and the insertion hole 95 formed in the tongue-shaped portion 92c are set to be opened along the vertical direction. Furthermore, both of the protruding main body 39b inserted into the insertion hole 95 of the tongue-shaped portion 92c and the fixation wire 37 inserted into the insertion hole 25 of the tongue-shaped portion 24 of the left lock mechanism 14 are set to extend downward.

For this reason, when each of the side bolsters 31 and 32 is assembled, it is possible to determine the position of each of the side bolsters 31 and 32 simply by moving the side bolsters 31 and 32 from the top to the bottom and inserting the fixing wire 37 and the protruding main body 39b, respectively, into the insertion holes 25 and 95. Accordingly, it is possible to facilitate an assembly operation of each of the side bolsters 31 and 32.

The side bolsters 31 and 32 have the side bolster fixing portions 41 formed at locations which are different from the locations at which the left lock mechanism 14 and the right lock mechanism 15 and the left bracket 92 and the right bracket 93 are formed, respectively. For this reason, after determining the positions of the side bolsters 31 and 32, it is possible to reliably fix the side bolsters 31 and 32 onto the vehicle body 2. Accordingly, it is possible to improve workability of attaching the side bolsters 31 and 32.

The present invention is not limited to the embodiment, and various modifications can be made to the embodiment insofar as the modifications do not depart from the scope of the present invention.

For example, the embodiment describes the following case: the tongue-shaped portion 24 is provided in the striker 17, and the insertion hole 25 is formed in the tongue-shaped portion 24 whereas the fixing wire 37 inserted into the insertion hole 25 is provided in each of the side bolsters 31 and 32. However, the present invention is not limited to the embodiment. The insertion hole 25 may be provided in each of the side bolsters 31 and 32, and a protruding portion that can be inserted into the insertion hole 25 may be provided on the striker 17. Furthermore, the striker 17 and each of the side bolsters 31 and 32 are preferably configured in such a manner that the striker 17 is engageable and disengageable with respect to each of the side bolsters 31 and 32.

The embodiment describes the following case: the tongue-shaped portion 92c is provided in each of the left bracket 92 and the right bracket 93, and the insertion hole 95 is formed in the tongue-shaped portion 92c whereas the protruding portion 39 inserted into the insertion hole 95 is provided in each of the side bolsters 31 and 32. However, the present invention is not limited to the embodiment. The insertion hole 95 may be provided in each of the side bolsters 31 and 32, and a protruding portion that can be inserted into the insertion hole 95 may be provided on each of the brackets 92 and 93. Furthermore, the brackets 92 and 93 and the corresponding side bolsters 31 and 32 are preferably configured in such a manner that the brackets 92 and 93 are respectively engageable and disengageable with respect to the side bolsters 31 and 32.

The embodiment describes the following case: the insertion hole 25 formed in the tongue-shaped portion 24 is set to be opened along the vertical direction, and the insertion hole 95 formed in the tongue-shaped portion 92c is also set to be opened along the vertical direction. However, the present invention is not limited to the embodiment. It is possible to arbitrarily set the opening direction of each of the insertion holes 25 and 95. Similarly, it is possible to arbitrarily set the protruding direction of the protruding main body 39b inserted into the insertion hole 95 of the tongue-shaped portion 92c, and the extension direction of the fixing wire 37 inserted into the insertion hole 25 of the tongue-shaped portion 24 of the left lock mechanism 14.

Furthermore, the embodiment describes the following case: the supporting bracket 9 (the center bracket 91, the left bracket 92 and the right bracket 93) is fixed onto the floor 3 of the vehicle body 2 (refer to FIG. 1). However, the present invention is not limited to the embodiment and the supporting bracket 9 may be provided on the seat cushion 6.

The embodiment describes the following configuration: the tongue-shaped portion 24 is provided in the striker 17, the tongue-shaped portion 92c is provided in each of the left bracket 92 and the right bracket 93, and the tongue-shaped portions 24 and 92c engage with the side bolsters 31 and 32, respectively. However, the present invention is not limited to the embodiment. The present invention preferably may have a configuration in which the tongue-shaped portion is provided in at least one of the striker 17, the bracket 92 and the bracket 93, and the tongue-shaped portion is engageable and disengageable with respect to each of the side bolsters 31 and 32.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle seat comprising:
   a seat back that is tiltably provided with respect to a floor of a vehicle body or a seat cushion which is disposed along an extension direction of the floor;
   a side bolster that is provided between the outside in a width direction of the seat back and a side wall of the vehicle body;
   a lock mechanism that includes a lock provided on the seat back, and a striker which is disposed at a rear of the seat back and is fixed onto the vehicle body, the lock mechanism fixing the seat back at an erection position; and
   a supporting bracket that is provided on the vehicle body or the seat cushion to tiltably support the seat back, wherein
   a backrest surface of the seat back and a front surface of the side bolster are provided to connect to each other, wherein
   a vehicle body member configured to have the striker and the supporting bracket is disposed on a rear side of the side bolster, wherein
   a position determination mechanism is provided in the side bolster and in at least one of the striker and the supporting bracket to determine position of the side bolster with respect to the vehicle body member, and wherein
   the position determination mechanism includes: an engagement hole that is provided in at least one of the striker and the supporting bracket; and a protruding piece that protrudes from a rear surface of the side bolster and is insertable into the engagement hole.

2. The vehicle seat according to claim 1, wherein
   the position determination mechanism is provided at both the striker and the supporting bracket, and
   opening directions of both engagement holes of the striker and the supporting bracket are set to be substantially the same as a protruding direction of the protruding piece of the side bolster.

3. The vehicle seat according claim 1, wherein
   a fixing portion for fixing the side bolster onto the vehicle body is provided in a portion different from a portion where the position determination mechanism is provided.

* * * * *